Oct. 26, 1926.

A. H. TIMM 1,604,502

CLUTCH LEVER HOLDER MEANS

Filed April 17, 1926

Inventor

A.H.Timm,

By Clarence A. O'Brien

Attorney

Patented Oct. 26, 1926.

1,604,502

UNITED STATES PATENT OFFICE.

ALFRED H. TIMM, OF HOOPER, NEBRASKA.

CLUTCH-LEVER HOLDER MEANS.

Application filed April 17, 1926. Serial No. 102,739.

My present invention has to do with means for holding the clutch levers of tractors; and it contemplates the provision of means for said purpose possessed of the practical advantages hereinafter explicitly ascribed to the same.

The invention in all of its details will be fully understood from the following description and claim when the same are read in connection with the drawings, accompanying and forming part of this specification, in which:—

Similar numerals of reference designate corresponding parts in all of the views of the drawings.

Figure 1:
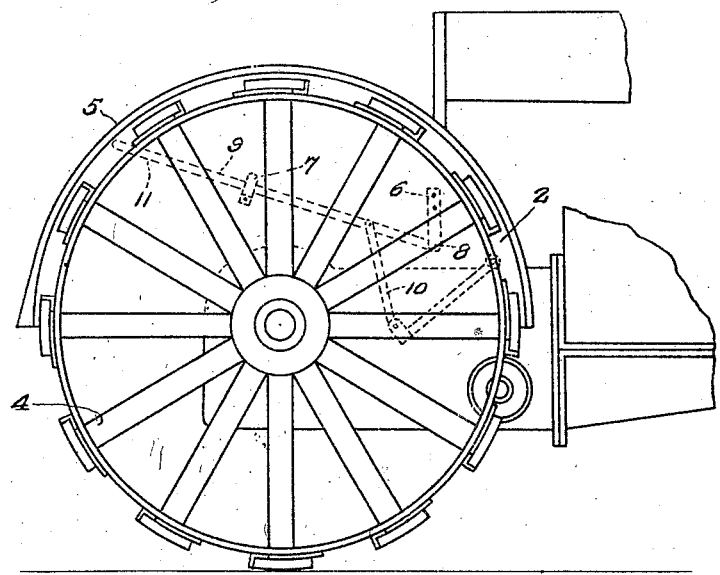
Figure 1 is a fragmentary side elevation showing so much of a tractor as is necessary to make clear the application of my improvement.
Figure 2:
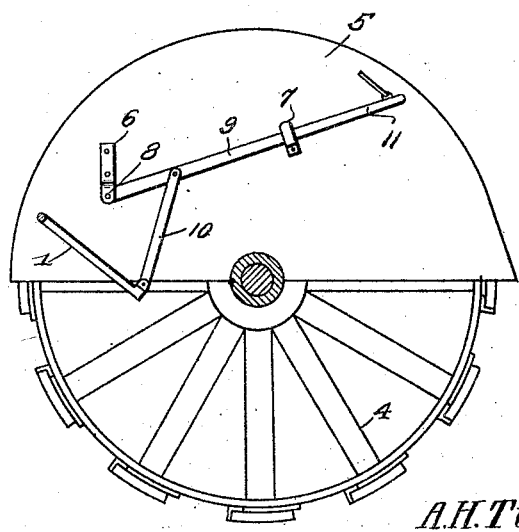
Figure 2 is a longitudinal vertical section taken at the inner side of the traction wheel shown in Figure 1 and also at the inner side of the conventional center over said wheel.
Figure 3:
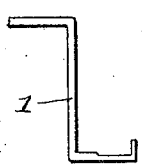
Figure 3 is a detail perspective of the clutch pedal lever with which my improvement is associated.

The tractor illustrated is known commercially as the Fordson, and it is provided with a clutch of a suitable type disposed between the internal combustion engine and the transmission, the said clutch being in connection in conventional manner with a pedal 1 adapted to be depressed by the foot of an operator for releasing the connection between the internal combustion engine and the transmission of the tractor. As illustrated the clutch pedal 1 is extended outwardly through one side of the transmission housing designated by 2 and has the outer foot engaging portion best shown in Figure 3. I would also have it understood that the tractor includes a pulley 3, in accordance with prevailing practice, the said pulley 3 being disposed at one side of the transmission housing alluded to and provided with a shaft extended through the housing and connected with the gears of the transmission so that the power of the internal combustion engine of the tractor may be used when desirable for operating farm machinery of various kinds.

The traction wheel of the tractor is designated by 4, and over said wheel 4 is arranged a fender 5.

The said fender 5, in accordance with my invention, is provided at its inner side with a bracket 6 and with a stop rest 7, and pivotally connected at 8 to the bracket 6 and movable vertically in a plane parallel with the inner side of the fender 5 is a lever 9, the said lever 9 being movable to and from a position in the stop rest 7 as illustrated. At a point between the bracket 6 and the stop rest 7, a link 10 is pivotally connected to the lever 9, and said link 10 is also connected with the lateral foot engaging portion of the pedal lever 1.

With the parts of my improvement in the illustrated positions, the clutch in connection with the pedal 1 is released while when the lever 9 is swung upwardly from the illustrated position the clutch will be in engaged state.

Manifestly by virtue of my improvement a tractor operator is enabled to manipulate the clutch while said operator is standing at the side of the tractor, and hence the inconvenience of the operator moving to the back of the tractor for said purpose is eliminated. Again it will be understood that by virtue of my improvement casual engaging of the clutch is absolutely averted, and hence it is safe for the operator to work at the belt driven machine while the engine is running. Very often it is desired to control the tractor from a binder seat and to the attainment of this end cable designated by 11 may be attached to the lever 9 and extended to a point in convenient proximity to the binder seat so that the clutch may be manipulated without the operator leaving the binder seat.

It will further be appreciated from the foregoing that when the lever 9 rests in the position illustrated, it is positively held against downward movement by the stop 7, and hence there is no liability of casual disengagement of the clutch taking place.

In addition to the practical advantages ascribed to my improvement, it will be appreciated that the improvement is extremely simple and inexpensive in construction, is susceptible of being readily installed upon tractors such as at present in use, and in its entirety is well adapted to withstand the usage to which tractor appurtenances are ordinarily subjected.

While I prefer the construction and relative arrangement precisely as shown and described, I do not desire to be understood as limiting myself to the disclosed structure, my invention being defined by my appended claim within the scope of which modifications may be made without departure from my invention.

Having described my invention, what I claim and desire to secure by Letters-Patent, is:—

In combination, a tractor having a movable clutch pedal characterized by a laterally extending foot-engaging portion, stationary supporting means, a stop carried by said supporting means, a lever arranged to swing vertically upwardly from and downwardly to said stop, and a connection between said lever and said pedal lever; the said supporting means being in the form of a fender complementary to an adjacent traction wheel, and the vertically swingable lever being connected at one end to a bracket on said fender, and the connection between said lever and the pedal being in the form of a link interposed between an intermediate portion of the vertical swingable lever and the laterally extending portion of the pedal lever.

In testimony whereof I affix my signature.

ALFRED H. TIMM.